INVENTOR
Reinhard M. Müller
By
Patent Agent

Sept. 15, 1959  R. M. MÜLLER  2,904,020
DIESEL ENGINE

Filed Aug. 5, 1957  3 Sheets-Sheet 3

INVENTOR
Reinhard M. Müller
By
Patent Agent

United States Patent Office 2,904,020
Patented Sept. 15, 1959

2,904,020

DIESEL ENGINE

Reinhard M. Müller, Koln-Deutz, Germany, assignor to Josef Effenberger, Bingen, Germany Application August 5, 1957, Serial No. 676,334

Claims priority, application Germany August 6, 1956

6 Claims. (Cl. 123—32)

The present invention relates to a diesel engine with a combustion chamber in which a rotational movement of the combustion air may be produced, and in which the fuel by means of a fuel injection nozzle is deposited as a thin film upon the wall of the combustion chamber.

With diesel engines of the above mentioned type, the fuel is by means of said rotating combustion air gradually detached from the wall of the combustion chamber in form of a vapor whereupon it is intermixed with the air and burned. The rotational movement of the air has to fulfill a twofold purpose, namely it must bring about a quick and effective detachment of the fuel from the wall of the combustion chamber and must subsequently bring about an intermixture of the fuel and the air.

It has been found that the reaction of such a diesel engine during the starting operation is less favorable than is the case with diesel engines working with an atomization of the fuel by the nozzle. This is due to the fact that with diesel engines of the first mentioned type, during the starting operation there is not available a finely atomized fuel quantity contacting the combustion air on all sides as is necessary for initiating the ignition.

In order to overcome this drawback, it has been suggested with diesel engines of the first mentioned type to inject a fine fuel jet transverse through the combustion chamber so that said fuel jet will initiate the ignition as is customary with the jet injection. With this type of fuel jet injection, there exists, however, the danger that the fine injection opening of the nozzle will be blocked by the formation of coke and thereby will be made ineffective.

It is, therefore, an object of the present invention to provide a simplified diesel engine of the above mentioned type which will overcome the above mentioned drawbacks.

It is another object of this invention to provide an improved diesel engine of the above mentioned type which without special spray openings in the fuel injection nozzle will enable the diesel engine to start quickly.

These and other objects and advantages of the invention will appear more clearly from the following specification in connection with the accompanying drawings, in which Fig. 1 illustrates a vertical section through a portion of a cylinder and cylinder head of an improved diesel engine according to the invention.

*General arrangement*

The problem underlying the present invention, namely to improve a diesel engine with revolving combustion air in such a way that it will start considerably easier than heretofore, has been solved according to the present invention by providing in the wall of the combustion chamber a recess which is spaced from the fuel injection nozzle by a certain distance. This recess in the wall of the combustion chamber brings about that the fuel will be torn off the wall of the combustion chamber at the edge of said recess whereupon it will be surrounded on all sides by the combustion air. The present invention takes advantage of the fact that the fuel when being readied for combustion will be exposed to a preoxidation along the wall of the combustion chamber whereby the fuel will become ignitable. Thus, it will ignite immediately when at the edge of the recess it is drawn into the free air space.

The heretofore known diesel engines employing a combustion method according to which the fuel is deposited in form of a film upon the wall of the combustion chamber are generally provided with a combustion chamber arranged in the piston and having the shape of a body of revolution. With such a diesel engine, the recess when looking in the direction of injection of the fuel may be located in the side wall of the combustion chamber. However, it is also feasible that in conformity with the present invention a recess is employed which is normally provided in said diesel engine for another purpose. Thus, as recess an opening may be employed through which the combustion air passes into the combustion chamber, for instance the opening of a throat pertaining to a turbulence or whirling or rolling chamber.

*Structural arrangement*

Figure 1:
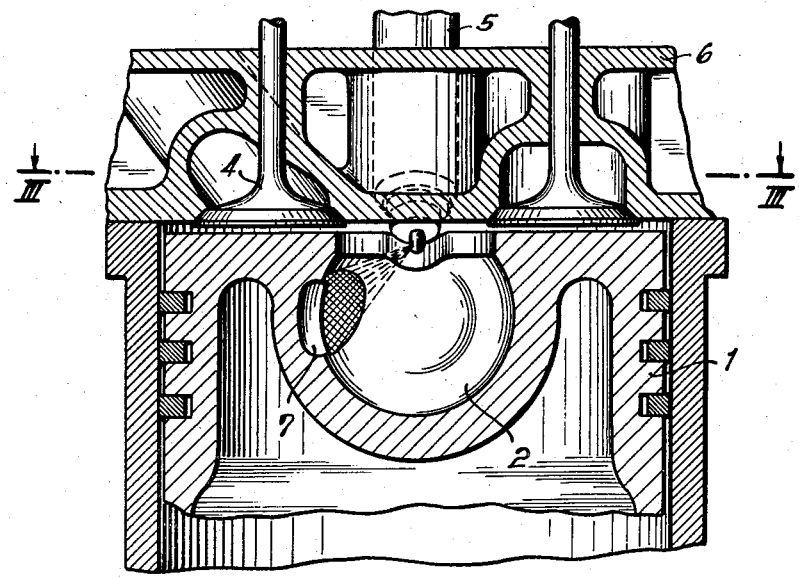
Figure 2:
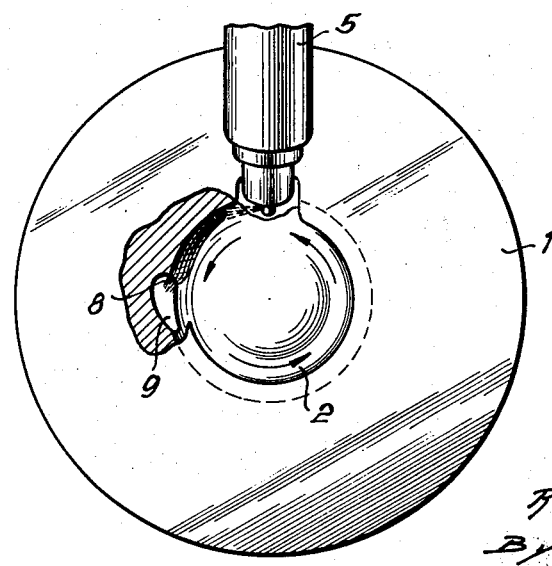
Fig. 2 is a top view of the piston of Fig. 1.
Figure 3:
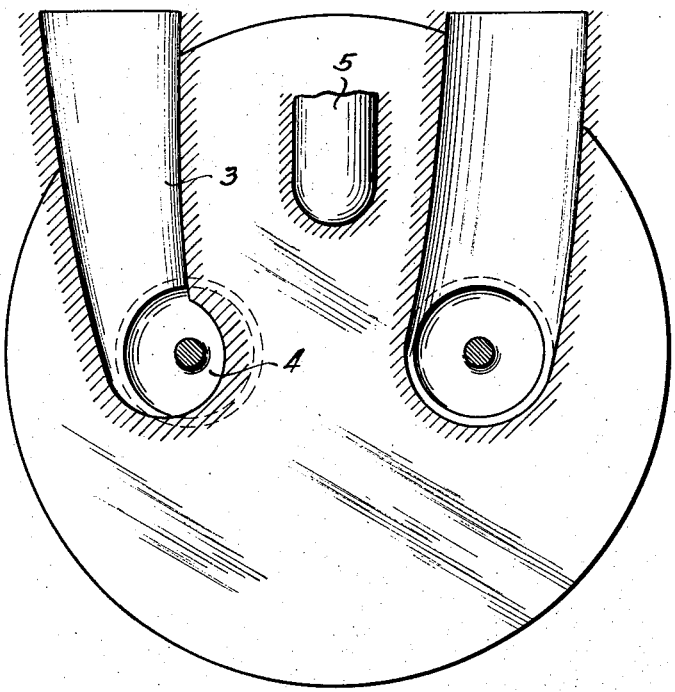
Fig. 3 is a section taken along the line III—III of Fig. 1.

Referring now to the drawings in detail and Figs. 1 to 3 thereof in particular, the arrangement shown therein comprises a piston 1 provided with a combustion chamber 2 having the shape of a body of revolution. Toward the end of the combustion stroke of piston 1, a rotational movement of the combustion air in conformity with the arrows shown in Fig. 2 is produced by designing the fuel inlet passage 3 leading to the inlet valve 4 in form of a spiral as shown in Fig. 3. The fuel injection nozzle 5 is arranged in the cylinder head 6 at such an angle that by means thereof the fuel will be conveyed in the direction of the rotational movement of the combination air to the wall of a combustion chamber over the shortest possible path. The fuel may leave the fuel injection nozzle 5 in form of a plurality of jets. The fuel is by means of the fuel injection nozzle 5 deposited upon the wall of the combustion chamber 2 in the form of a thin film whereupon by means of the rotating combustion air in form of a vapor said thin film is gradually detached from the wall of the combustion chamber and is intermixed with air and burned. In order to improve the starting ability of the machine, a recess 7 is provided at a certain distance from the fuel injection nozzle when looking in the direction of movement of the fuel. This recess brings about that the fuel is torn off from the edge 8 of the recess 9 (see Fig. 2) and is surrounded by compressed air on all sides. As a result thereof, at the edge 8 of the recess 9 the initiation of the ignition is favored whereby the starting ability of the engine is greatly improved.

Figure 5:
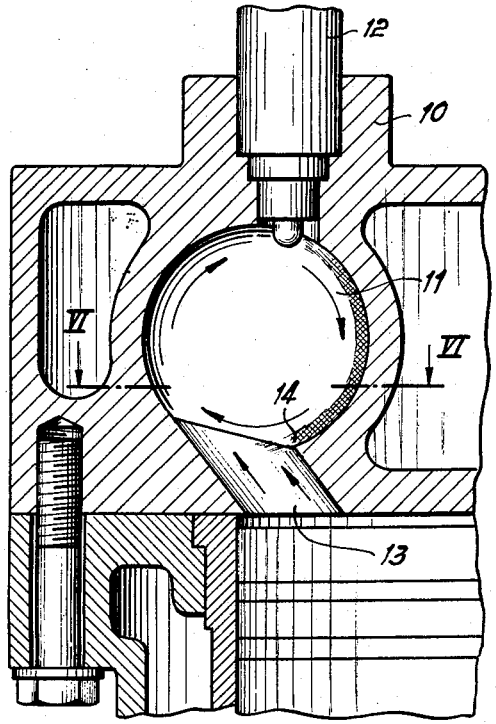
Fig. 5 is a vertical section through a portion of the cylinder head and the engine block with a cylinder bushing and piston of a four-stroke cycled diesel engine.
Figure 6:
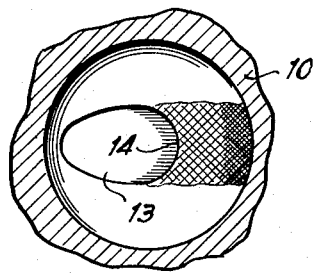
Fig. 6 is a section taken along the line VI—VI of Fig. 5.

The diesel engine according to Figs. 5 and 6 is of the type which is provided with a turbulence chamber arranged in the cylinder head 6. The fuel by means of a fuel injection nozzle is conveyed into said turbulence chamber in such a way that after a short distance in the direction of rotational movement of the combustion air it will contact the wall of the combustion chamber and will form a thin film upon the latter which will be gradually detached in form of a vapor from the wall of the combustion chamber by the combustion air whereupon it will be mixed and burned. The rotational or whirling movement of the combustion air is in contrast to the diesel engine according to Figs. 2 and 1 produced not by the special design of the inlet passages leading to the inlet valve but by the whirling chamber with its throat 13. The fuel injection nozzle 12 is so arranged that said throat 13 acts as recess in the meaning of the present invention. At the edge 14 of the throat 13 a portion of the fuel injected through the nozzle 12 detaches itself from the wall of the combustion chamber and in this way will be surrounded by combustion air from all sides so that also such an arrangement will greatly improve the ignition ability of the diesel engine.

Figure 4:
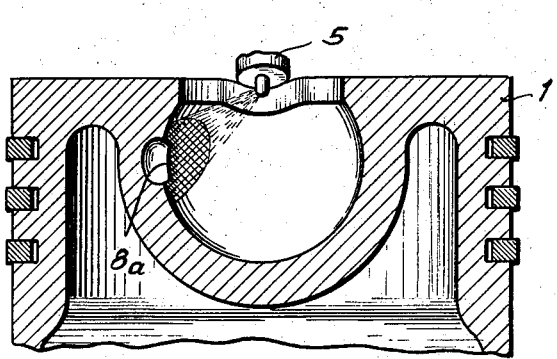
Fig. 4 shows a modification of a detail of the piston of Fig. 1.

With the two diesel engines illustrated in Figs. 1 and 5, the dimensions of the recess are so selected that the fuel film formed on the wall of the combustion chamber will tear off along its entire width at the edges 8 and 14 respectively. It is to be understood that the dimensions in the transverse direction of said recess may also be designed smaller with regard to the direction of injection of the fuel. Thus, a smaller portion only of the fuel, i.e. of the fuel film deposited on the wall of the combustion chamber may tear off at the edge 8a of the recess for initiating the ignition (Fig. 4). The tearing off of the fuel is best obtained when the recess is provided with a sharp edge facing the fuel injection nozzle as is illustrated in particular in Figs. 2 and 5. As to the distance of the tearing edge from the fuel injection nozzle, this distance has to be established by experiments for each combustion chamber. While with the diesel engine according to Figs. 1 and 2, the distance is determined by the arrangement of the recess 9, with the diesel engine according to Figs. 5 and 6, the distance is determined by the arrangement of the fuel injection nozzle.

While the invention has been described in connection with two different types of diesel engines, it is to be understood that the invention is not limited thereto. As a matter of fact, the invention may advantageously also be employed with diesel engines with other type combustion chambers adapted by a corresponding arrangement of the fuel injection nozzle to draw the fuel out of a fuel film for intermixing with the combustion air and which due to their particular type already have a recess which could function as recess in conformity with the present invention. In this connection a rolling chamber may be employed which does not materially differ as to shape from the turbulence chamber according to Figs. 5 and 6.

It is also to be understood that the present invention is, by no means, limited to the particular construction shown in the drawings but also comprises any modifications within the scope of the appended claims. It should also be borne in mind that the present invention is also suitable in connection with two-stroke diesel engines.

What I claim is:

1. In a diesel engine having a combustion chamber, a fuel injection nozzle arranged to deposit a fuel film on the wall of said combustion chamber, said combustion chamber being provided with a recess arranged in spaced relationship to said injection nozzle and having an edge located in the path of movement of the fuel from said injection nozzle, whereby said fuel film when hitting said edge is torn off from the wall of said combustion chamber and is surrounded by combustion air on all sides thereof.

2. In combination in a diesel engine: a cylinder, a piston movably mounted in said cylinder and provided with a combustion chamber, a fuel injection nozzle arranged to deposit a fuel film on the wall of said combustion chamber, the wall of said combustion chamber having a recess therein with an edge located in the path of movement of the fuel from said injection nozzle, and combustion air conveying means arranged to convey combustion air in a whirling manner into said combustion chamber.

3. In a diesel engine having a combustion chamber and passage means for conveying combustion air into said chamber, a fuel injection nozzle arranged to deposit a fuel film on the wall of said combustion chamber, said passage means forming with said combustion chamber an edge located in the path of fuel from said nozzle and arranged to tear off said fuel film from the wall of said combustion chamber when being engaged by said fuel film.

4. In combination a diesel engine having a turbulence chamber and a throat leading into said turbulence chamber for conveying combustion air thereinto, and a fuel injection nozzle arranged to deposit a fuel film on the wall of said chamber, said throat forming with said turbulence chamber an edge located in the path of movement of the fuel from said nozzle.

5. An arrangement according to claim 1, in which said edge has at least a portion thereof arranged transverse to the path of movement of the fuel from said nozzle, and in which said transverse portion is narrower than the fuel film.

6. In a diesel engine having a combustion chamber, a fuel injection nozzle arranged to deposit a fuel film on the wall of said combustion chamber, said combustion chamber being provided with a recess arranged in spaced relationship to said injection nozzle and provided with a sharp edge facing said injection nozzle and arranged in the path of movement of the fuel from said injection nozzle to the wall of said combustion chamber.

References Cited in the file of this patent
UNITED STATES PATENTS
2,762,348   Meurer _____ Sept. 11, 1956